(12) United States Patent
Thuo et al.

(10) Patent No.: US 10,471,469 B2
(45) Date of Patent: Nov. 12, 2019

(54) HIGH ASPECT RATIO NANOSTRUCTURES AND METHODS OF PREPARATION

(71) Applicant: UNIVERSITY OF MASSACHUSETTS, Boston, MA (US)

(72) Inventors: Martin Thuo, Ames, IA (US); Ian Tevis, Brighton, MA (US)

(73) Assignee: University of Massachusetts, Boston, MA (US)

( * ) Notice: Subject to any disclaimer, the term of this patent is extended or adjusted under 35 U.S.C. 154(b) by 294 days.

(21) Appl. No.: 15/318,911

(22) PCT Filed: Jun. 19, 2015

(86) PCT No.: PCT/US2015/036628
§ 371 (c)(1),
(2) Date: Dec. 14, 2016

(87) PCT Pub. No.: WO2015/196039
PCT Pub. Date: Dec. 23, 2015

(65) Prior Publication Data
US 2017/0120295 A1    May 4, 2017

Related U.S. Application Data

(60) Provisional application No. 62/014,425, filed on Jun. 19, 2014.

(51) Int. Cl.
| | | |
|---|---|---|
| *B05D 7/24* | (2006.01) |
| *C01G 15/00* | (2006.01) |
| *B01J 2/24* | (2006.01) |
| *B05D 1/30* | (2006.01) |
| *B05D 3/00* | (2006.01) |

(52) U.S. Cl.
CPC ............... *B05D 7/24* (2013.01); *B01J 2/24* (2013.01); *B05D 1/30* (2013.01); *B05D 3/007* (2013.01); *C01G 15/00* (2013.01)

(58) Field of Classification Search
CPC .. B01J 2/24; B22F 1/0025; B22F 9/24; C01G 15/00; C01G 1/02; B82Y 40/00
See application file for complete search history.

(56) References Cited

U.S. PATENT DOCUMENTS

| | | |
|---|---|---|
| 5,897,945 A | 4/1999 | Lieber et al. |
| 8,337,799 B2 | 12/2012 | Bogicevic et al. |
| 8,383,682 B2 | 2/2013 | Dunbar |

(Continued)

FOREIGN PATENT DOCUMENTS

| | | |
|---|---|---|
| CN | 102745739 A | 10/2012 |
| WO | 2013137818 A1 | 9/2013 |

OTHER PUBLICATIONS

Bottom-Up and Top-Down Approaches to the Synthesis of Monodispersed Spherical Colloids of Low Melting-Point Metals Yuliang Wang and and Younan Xia Nano Letters 2004 4 (10), 2047-2050 DOI: 10.1021/nl048689j.*

(Continued)

*Primary Examiner* — Alex A Rolland
(74) *Attorney, Agent, or Firm* — Renner, Otto, Boisselle & Sklar, LLP

(57) ABSTRACT

Metal nanomaterials and nanostructures may be formed via shearing force in the presence of a reactant.

19 Claims, 4 Drawing Sheets

(56) References Cited

U.S. PATENT DOCUMENTS

| | | |
|---|---|---|
| 2007/0113779 A1 | 5/2007 | Wong et al. |
| 2009/0202815 A1 | 8/2009 | Campazzi et al. |
| 2009/0258076 A1 | 10/2009 | Cheon et al. |
| 2010/0127241 A1 | 5/2010 | Gruner et al. |
| 2013/0089739 A1 | 4/2013 | Polshettiwar et al. |

OTHER PUBLICATIONS

Graham, Um et al., Nanoweb Formation: 2D Self-Assembly of Semiconductor Gallium Oxide Nanowires/Nanotubes, Adv. Funct. Mater., Jul. 2003; abstract; p. 576, col. 2, middle; p. 577 col. 1, top/middle/end; p. 580, col. 1, end.

* cited by examiner

HIGH ASPECT RATIO NANOSTRUCTURES AND METHODS OF PREPARATION

CROSS-REFERENCE TO RELATED APPLICATIONS

This application is a U.S. national phase application, and claims the benefit of priority under 35 U.S.C. § 371, of International (PCT) Application Serial No. PCT/US2015/036628, title HIGH ASPECT RATIO NANOSTRUCTURES AND METHODS OF PERPARATON as filed on Jun. 19, 2015, which in turn claims the benefit of priority to U.S. Provisional Patent Application Ser. No. 62/014425 filed on Jun. 19, 2014 which is hereby incorporated herein by reference in its entirety for all purposes.

FIELD OF THE TECHNOLOGY

One or more aspects relates to methods of making nanostructures, and more specifically, to the preparation of gallium, indium, gallium alloy, and indium alloy nanostructures.

BACKGROUND

Nanostructures are used in a variety of applications that require a large surface area of metal oxide or a micro to nanoscale high aspect ratio metal oxide. Gallium and indium nanostructures are of particular importance in a variety of fields, including but not limited to the semiconductor and battery industry, solar energy applications, the development of sensors, transistors, and electrochemical cells, and specialty coatings. Various aspects and embodiments disclosed herein may find particular applicability in one or more of those fields.

The techniques used to make nanostructures, for example, gallium oxide nanostructures, generally involve at least one of physical evaporation, arc-discharge, laser ablation, carbothermal reduction, chemical vapor deposition, metal organic chemical vapor deposition, or a microwave plasma process. These techniques are energy intensive and often require sophisticated equipment and catalysts. The high temperatures and energy requirements, size and cost of the necessary equipment, and problems incurred when removing trapped catalysts make the synthesis of nanostructures costly.

SUMMARY

In accordance with one or more aspects, a process for preparing a nanostructure may comprise adding a metal to a reaction solution, forming a metal oxide on a metal surface, shearing off metal oxide particles from the metal surface, allowing the sheared metal oxide particles to self-assemble into nanomaterials, and casting the self-assembled nanomaterials on a substrate to form the nanostructure.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
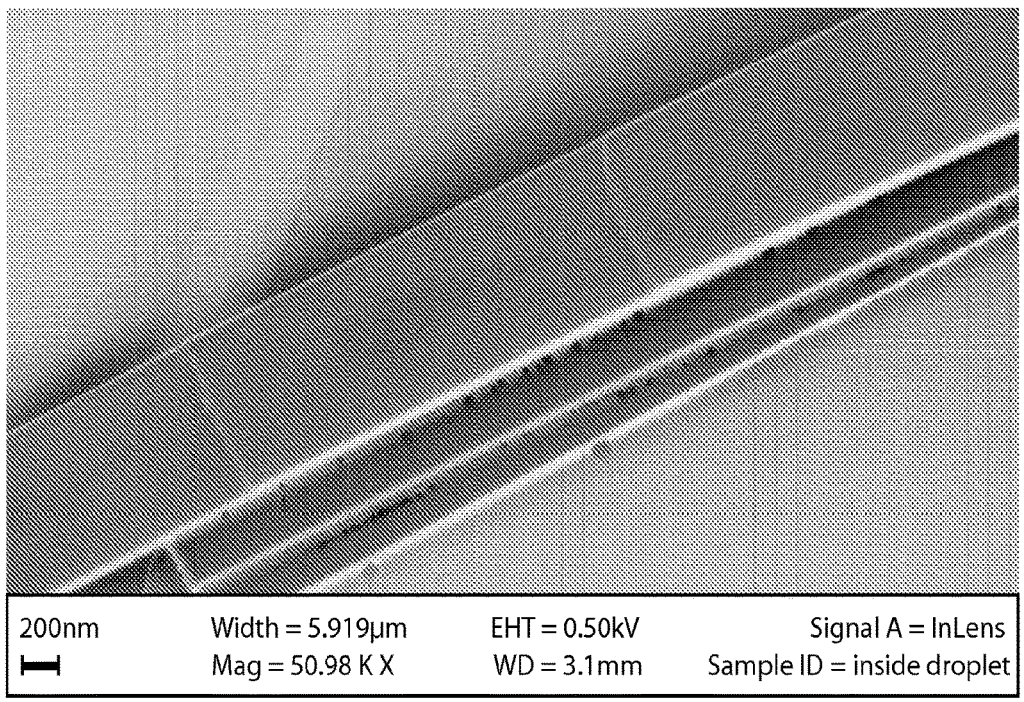
FIG. 1 shows a striated nanomaterial in accordance with at least one embodiment.

In accordance with various aspects and embodiments, low-cost methods of preparing nanostructures and aggregations of nanostructures are provided.

In accordance with one or more aspects and embodiments, a method of preparing nanostructures and films is disclosed that does not rely on high temperatures, costly equipment, or catalysts. The methods disclosed herein may advantageously reduce the cost of preparing high aspect ratio nanostructures at comparable or improved yields. As used herein, the phrase "high aspect ratio" may in some non-limiting embodiments denote a ratio of length to thickness greater than about 500 to 1, for example, about 1000 to 1.

In accordance with aspects and embodiments, the method involves the synthesis of metal oxides and derivatives having the following general formula:

$$M_nO_xC_yH_z$$

In at least some embodiments, M is selected from the group of metals consisting of indium, gallium, and alloys thereof. The chemical composition of the resulting nanostructure can vary, and different amounts of metal (M), oxygen (O), carbon (C) and hydrogen (H) may be present in the resulting structure depending on the desired properties of the nanostructures, as shown by the undefined subscripts n, x, y, and z. In accordance with aspects and embodiments, the nanomaterials of the present disclosure may be made with or without an organic molecule in the general formula.

The nanomaterials may be made, for example, with any of carboxylic acid, water with a source of a proton, ethylene glycol and other polar solvents, and in peroxide or other strong oxidants. According to some embodiments the nanomaterials are synthesized in a reaction solution comprising acetic acid. The concentration of the acetic acid in the reaction solution may be in the range of 1 percent to 10 percent by volume. In some embodiments, the concentration of the acetic acid in the reaction solution may be between 1 percent and 5 percent. The presence of at least some metal ions in solution may promote nucleation and particle growth.

The final composition of the nanomaterial may be controlled by manipulating the ratios of reactants, acidity of the reaction medium, reagent selection and other process parameters during synthesis. For example, according to one embodiment, a lower concentration of acetic acid in the reaction solution, such as 1% as opposed to 5%, may be used to reduce the amount of acetic acid adsorbed on the surface of the oxides.

In accordance with aspects and embodiments, by combining droplet-surface templating, fluidic peeling, and self-assembly, nanomaterials of varied sizes can be fabricated. In some embodiments, particles may break off from the surface of metal and be suspended as fragments before self-assembling into beams. Post-synthetic processing (functionalization or self-assembly) may result in structures that are otherwise unattainable from other synthesis techniques, for example the hexagonal assemblies shown in FIG. 4 discussed below. Furthermore, the disclosed methods advantageously use simple tools as well as green solvents, and offer a low cost approach to making complex materials and structures that are generally extremely costly to produce.

According to one or more embodiments, a method of preparing a nanostructure may generally involve adding a metal to a reaction solution, forming a metal oxide on the surface of the metal, shearing off metal oxide particles from the surface of the metal by stirring, allowing the sheared particles to self-assemble into nanomaterials, and casting the nanomaterials into a three dimensional nanostructure.

According to one or more embodiments, the metal added to the reaction solution is in a liquid state. According to one or more embodiments, the metal is allowed to react in the solution for between about 2 to 24 hours prior to applying any shearing forces.

Reaction temperature is selected based upon the starting metal and solution composition. For example, when working with liquid metal, synthesis may be performed at a range near room temperature, for example from about 20° C. to about 30° C. Alternatively the synthesis may be performed at a temperature from about 20° C. to about 100° C. For low melting alloys, synthesis may be carried out at higher temperatures, for example, temperatures in a range of about 90° C. to about 150° C.

According to one or more embodiments, the formed metal oxide may include adsorbed organic layers on its surface. For example, acetate may be adsorbed on the surface of the metal oxide. The presence of adsorbed acetate, or other organic component, on the surface allows multiple layers of the oxides to be assembled through lipophilic interactions.

In accordance with some non-limiting aspects and embodiments, the method may comprise the use of shearing force, dissolution, nucleation growth, and/or self assembly. The shearing force may be applied by stirring the metal solution with an apparatus that creates centrifugal shear force. The shear force of the liquid during stirring causes the thin oxide surface formed on the metal to break off into micro- and nano-scale structures. In many cases, gentle shear with turbulent flow is enough to break off the oxide layer from the metal, because the oxide layer formed on the metal is not very strong.

After shearing, between 6 to 24 hours may be allowed for the step of self assembling, during which dissolved oxide particles nucleate and grow into small nanostructures. Self-assembly may take place at this stage without requiring any further facilitation.

According to certain embodiments, the solution and amount of metal added to solution may also be varied to control the rate of beam growth during self-assembly and the aspect ratios of the end product. For example, different concentrations of carboxylic acid provide for different rates of growth and different aspect ratios.

The synthesized nanomaterials are generally micron sized in length and may for example, have a length in the range of about one micron to about hundreds of microns. The synthesized nanomaterials have a thickness on the nanoscale, and may, for example, have a thickness in the range of less than about 10 nanometers to about 5 microns, and most commonly, have a thickness in the range of about 150 nanometers to about 400 nanometers.

FIG. 1 shows a striated nanomaterial having a micron length and nanoscale thickness. The striations show that the beam is made up of thinner sheets of material indicating that the beam is a self-assembled material. The self-assembling property of the disclosed nanomaterials allows the rate of growth to be controlled by engineering inter-layer interactions.

In accordance with certain embodiments, the self-assembled nanomaterial undergoes post-assembly modification. In some embodiments, the nanoparticles may be chemically modified to install hydroxyl and/or acetate moieties in the materials. According to certain embodiments, post-assembly modification may include the exchange of surface adsorbed acetic acid with hydroxyl moieties via an ester hydrolysis process.

The modified nanomaterial is cast on a substrate surface, such as silicon wafers, to provide assembled nanostructures, such as nanobelts, nanoribbons, nanosheets, nanobeams, nanowhiskers, with high aspect ratios.

The formation of these nanostructures may take place through a crystallization-like process that leads to different dimensions in the x-y-z directions based on the molecules that interact. For example, the oxide edge may interact with other oxides, while the acetates interact with other acetates, to create a beam-like structure.

Figure 2:
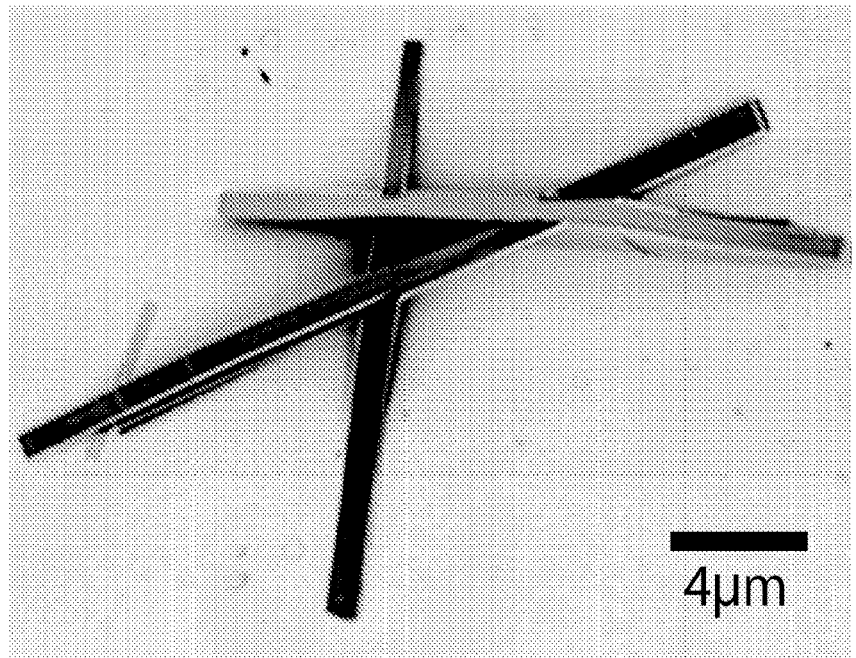
FIG. 2 shows a scanning electron microscope (SEM) image of a random structure built of nanoribbons in accordance with at least one embodiment.
Figure 3:
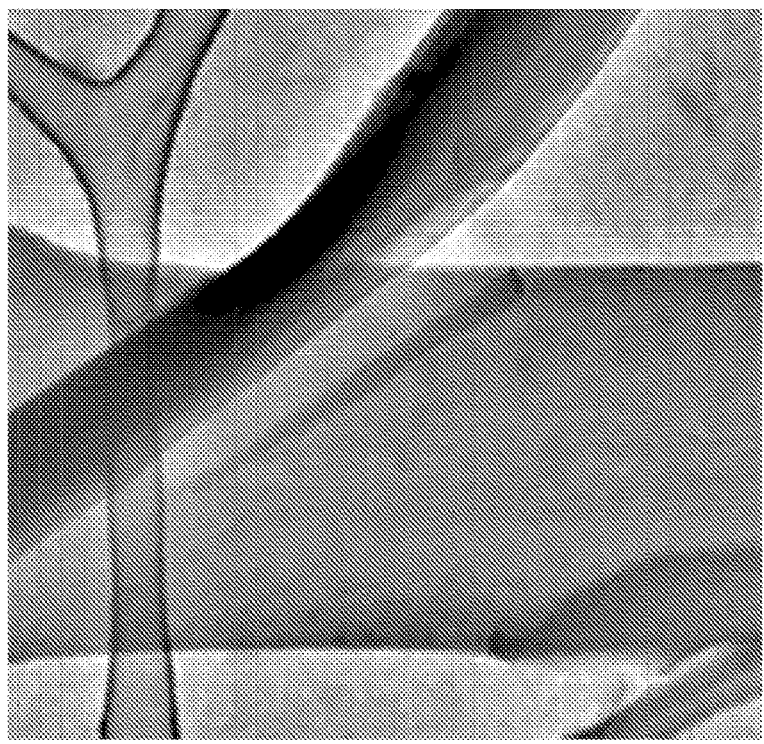
FIG. 3 shows a transmission electron microscope (TEM) image of similar nanobelts of different dimensions in accordance with at least one embodiment.

FIG. 2 shows a scanning electron microscope (SEM) image of a random structure built of nanoribbons synthesized by the disclosed method. FIG. 3 shows a transmission electron microscope (TEM) image of similar nanobelts of different dimensions synthesized by the disclosed methods.

Figure 4:
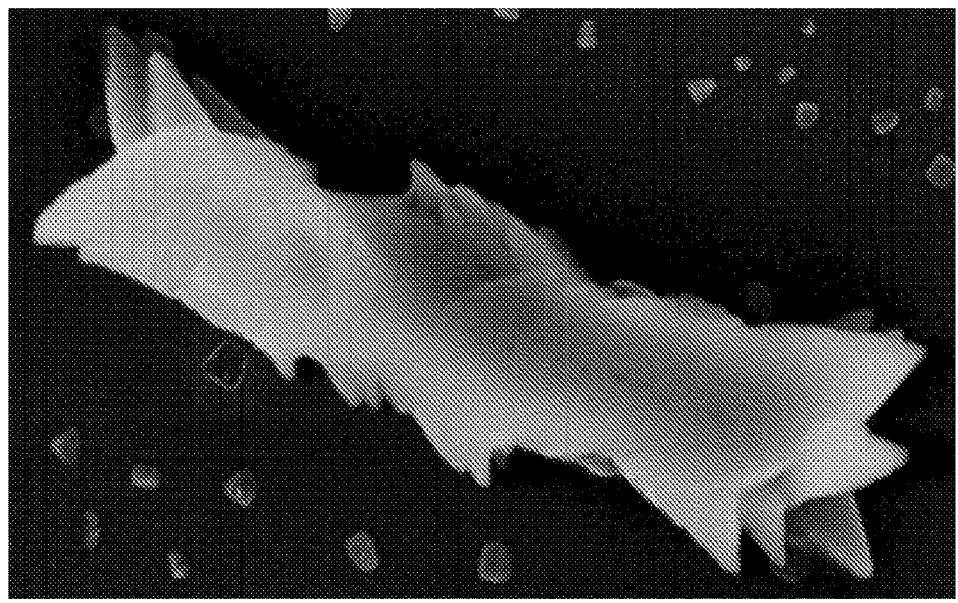
FIG. 4 shows synthesized metal oxide nanoribbons in accordance with at least one embodiment.

As shown in FIG. 4, through capillary-driven self-assembly, the synthesized metal oxide nanoribbons can also wrap around each other or assemble into different configurations to form structures of complex shape and size, such as hexagonal tubes, cylinders, and other shapes.

Figure 5:
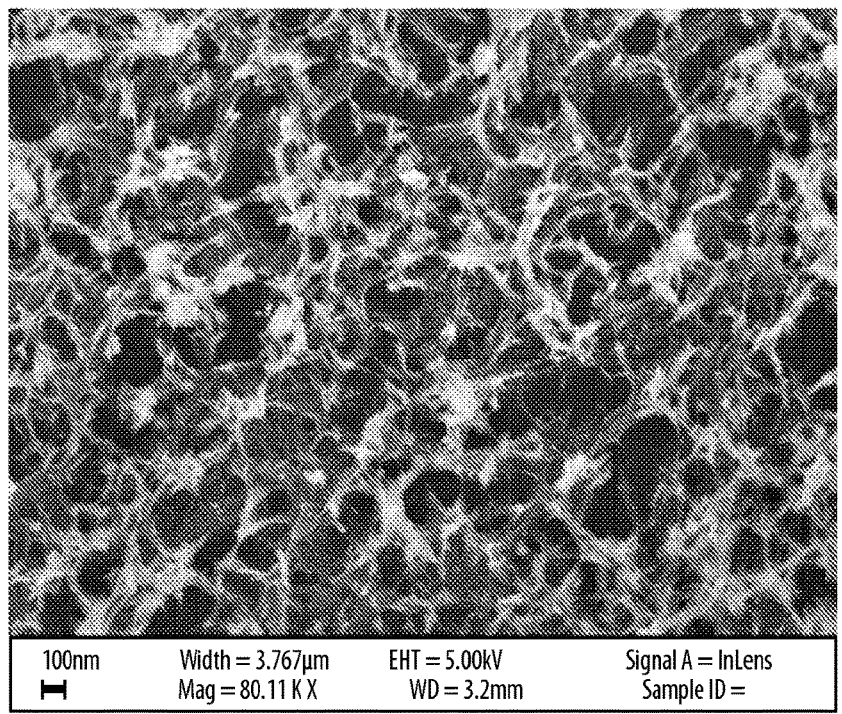
FIG. 5 shows nanowhiskers assembled into a porous structure in accordance with at least one embodiment.
Figure 6:
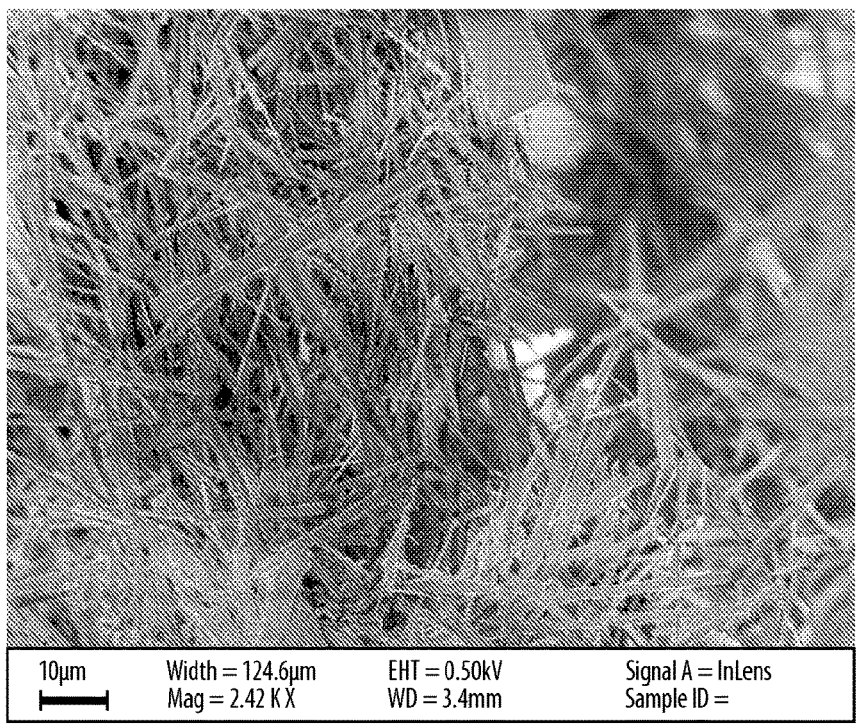
FIG. 6 shows stacked nanoribbons forming a sheet material in accordance with at least one embodiment.

When the oxide is broken down into nanowhiskers, the nanowhiskers can be assembled to give highly porous materials, as shown below in FIG. 5. Alternatively and as shown in FIG. 6, the nanoribbons can be stacked together to give white sheets of solid, paper-like materials.

The disclosed nanomaterials and nanostructures may be used in a variety of applications.

Some metal oxides or oxide derivatives are better semiconductors than silicon. In accordance with some embodiments, the methods of synthesizing nanomaterials disclosed herein can be used to generate nanomaterials for use in the electronics industry. New field-effect transistors may be fabricated from the nanomaterials synthesized by the disclosed methods that have better performance than conventional transistors. The disclosed synthesized nanomaterials and nanostructures may be used in opto-electronic devices where electrical properties and optical properties are desired. Metal oxides and their derivatives are known phosphors and can be used as transparent electrodes or device fabrication materials.

In accordance with aspects and embodiments, the synthesized nanomaterials and nanostructures disclosed may also find application in the energy field. The disclosed methods of synthesizing nanomaterials may be used to make nanomaterials for use as electrodes for fuel cells where large surface area and good conductivity are desired. Some metal oxides have large breakdown voltages better than silicon and as such would be ideal for electronic and high energy/performance applications.

In accordance with aspects and embodiments, the disclosed methods of synthesizing nanomaterials and nanostructures may provide advantages in the field of catalysis. The high surface area of the disclosed nanomaterials can be used for catalysis, especially in the reduction of waste gasses to fuels and use chemicals. For example, $Ga_2O_3$ has been shown to catalyze ester hydrolysis in polar protic medium.

In accordance with aspects and embodiments, the disclosed method of synthesizing nanomaterials and nanostructures may be used in plasmonics. When combined with self-assembly, the disclosed nanomaterials can generate interfaces with large density differences allowing propagation of surface plasmons. As such, they can be used to fabricate low cost plasmonic devices (no cleanroom or lithography).

In accordance with aspects and embodiments, the disclosed methods of synthesizing nanomaterials and nanostructures may be used in diagnostics. The synthesized nanomaterials and nanostructures can be functionalized with different biomarkers or adapted for bio-physical markers. The materials can then be employed in diagnostics and the treatment of surface delivery of different chemical or biological components.

The function and advantages of these and other embodiments will be more fully understood from the following non-limiting examples. The examples are intended to be illustrative in nature and are not to be considered as limiting the scope of the embodiments discussed herein.

EXAMPLES

Example 1

Preparing Nanomaterials and Nanostructures

The following example demonstrates that the disclosed nanomaterials and nanostructures may be prepared through a low-cost process using simple tools and components.

Various samples of acetic acid were prepared for use as the reaction solution. Glacial acetic acid (Pharmco-AAPER, ACS reagent grade 99.7%) was diluted in de-ionized water to make a 5% (v/v) solution. Trifluoroacetic acid (Alfa Aesar, 99%) was diluted in de-ionized water to make a 5% (v/v) solution. Store-bought distilled white vinegar having 5% acidity was used as received. Furthermore, ethanol (Pharmco-AAPER, 200 Proof Anhydrous) and diethylene glycol (Sigma Aldrich, 99%) were used for post-assembly modification as received.

For the metal, a Gallium-indium eutectic (Aldrich, ≥99.99% trade metal basis) was used as received. Gallium (Ga) (Alrdrich, ≥99.9995% trace metal basis), Indium (In) ((Aldrich, ≥99.999% trace metal basis), and Bismuth Indium Tin ingot (Field's metal, BI:In:Sn 32.5/51/16.5 wt. %, Alfa Aesar) were also used in similar syntheses.

Un-doped silicon wafers were diced, sonicated in acetone, and then dried in a filtered nitrogen stream to be used as substrates for electron microscopy.

Figure 7A:
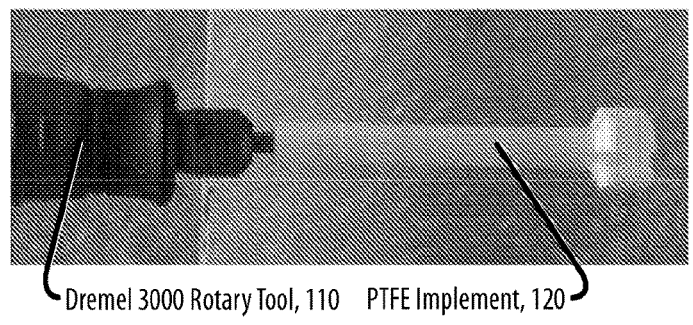
FIGS. 7A and 7B are a side view and bottom view, respectively, of a shearing device in accordance with at least one embodiment.
Figure 7B:
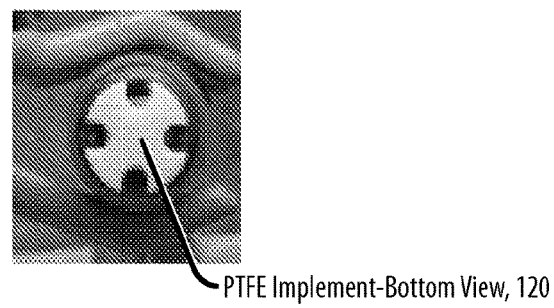

A 5 mL aliquot of 5% acetic acid (or trifluoroacetic) in de-ionized water was placed into a flat top glass vial with a 19 mm outer diameter and 50 mm height. A 0.6 gm droplet of Ga-In eutectic was added directly to the acid solution. After 24 hours, the solution containing the Ga-In eutectic was stirred using a PTFE shearing implement and analyzed. The PTFE implement had a cross-shape with a steel rod core. The implement 120 was attached to an extender accessory of a Dremel® 300 variable speed rotary tool 110, as whown in FIG. 1. The Dremel® tool 110 was operated at its maximum speed setting while its supply of voltage was adjusted by a variable transformer in order to vary the rotational speed of the stirrer. A side view of the PTFE mixer 120 attached to the Dremel® tool 110 is shown below in FIG. 7A, and a bottom view of the PTFE stirrer 120 is shown in FIG. 7B.

Rotational speeds were varied from between about 2,300 RPM and about 8,600 RPM using the variable transformer. Shearing time was varied from about 5 minutes to about 30 minutes. The resulting suspensions were allowed to sediment and incubate for 12 to 24 hours until a white suspension was observed.

The suspension was collected, washed with ethanol, drop cast on the prepared silicon wafers, and analyzed by scanning electron microscopy.

A Signature Gourmet™ blender model SB-19 was also used as a mixing apparatus. The model had a 16 oz. plastic cup. The tool was operated at its single speed setting while its supply voltage was adjusted by a variable transformer.

A 75 mL aliquot of distilled white vinegar was placed in the blender's 16 oz cup. Approximately 1.1 g of the Ga-In eutectic was directly added to the liquid in the cup. The eutectic was sheared in the blender with the variable speed transformer setting of 110V. The total shearing time was about 1 minute. The resulting suspension was collected, diluted in ethanol 8X, drop cast on the silicon wafers, let dry, and was then analyzed by scanning electron microscopy.

Figure 8:
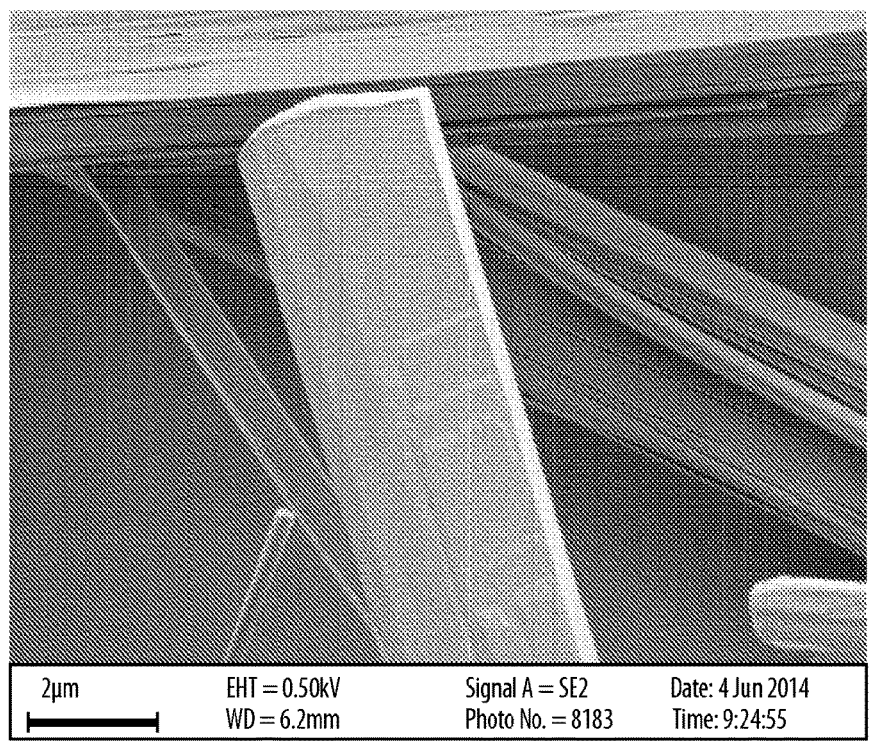
FIG. 8 shows a synthesized gallium nanobeam in accordance with at least one embodiment.

FIG. 8 shows a gallium nanobeam synthesized with 5% acetic acid in water at 95° C. and stirred with the Dremel® tool. These beams show different layers stacked on each other indicating the successful creation of a nanostructure.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the materials and methods discussed herein are not limited in application to the details of preparation and the arrangement of components set forth in the following description or illustrated in the accompanying drawings. The materials and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the materials and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, material, or technique described herein and any combination of two or more features, materials, or techniques described herein and any combination of two or more features, materials, and/or methods, if such features, materials, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A process for preparing a nanostructure comprising:
   adding a metal to a liquid reaction solution;
   forming a metal oxide on a surface of the metal;
   shearing off metal oxide particles from the surface of the metal;
   allowing the sheared metal oxide particles to self-assemble into nanomaterials; and
   casting the self-assembled nanomaterials on a substrate to form the nanostructure.

2. The process of claim 1, wherein adding the metal comprises adding gallium or alloys thereof.

3. The process of claim 1, wherein adding the metal comprises adding the metal in a liquid state.

4. The process of claim 1, wherein forming a metal oxide comprises forming a metal oxide having the following formula:

$$M_nO_XC_YH_Z$$

wherein M is a metal and n, x, y, and z are integers.

5. The process of claim 4, wherein M is gallium.

6. The process of claim 1, wherein the reaction solution comprises acetic acid.

7. The process of claim 6, wherein the sheared metal oxide particles comprise an adsorbed acetate layer.

8. The process of claim 1, wherein the reaction solution comprises an acetic acid solution having a concentration of acetic acid in the range of 1 percent to 10 percent by volume.

9. The process of claim 8, wherein the reaction solution comprises an acetic acid solution having a concentration of acetic acid in the range of 1 percent to 5 percent by volume.

10. The process of claim 1, wherein forming the metal oxide on the surface comprises allowing the metal to react with the reaction solution for 2 to 24 hours prior to shearing.

11. The process of claim 1, wherein forming the metal oxide on the metal surface takes place at a temperature of about 90° C. to about 150° C.

12. The process of claim 1, wherein forming the metal oxide on the metal surface takes place at a temperature of about 20° C. to about 100° C.

13. The process of claim 12, wherein forming the metal oxide on the metal surface takes place at a temperature of about 20° C. to about 30° C.

14. The process of claim 1, wherein shearing off metal oxide particles comprises stirring the metal oxide in the reaction solution with an apparatus that creates centrifugal shear force.

15. The process of claim 1, wherein the self-assembled nanomaterials have a thickness in the range of about 5 nanometers to about 5 microns.

16. The process of claim 1, wherein the self-assembled nanomaterials have a thickness in the range of about 150 nanometers to about 400 nanometers.

17. The process of claim 1, wherein the nanostructures have a high aspect ratio of length to thickness that is greater than about 1000 to 1.

18. The process of claim 1, wherein the substrate comprises silicon.

19. The process of claim 1, further comprising subjecting the nanostructure to post-assembly modification.

* * * * *